(12) United States Patent
Bar et al.

(10) Patent No.: US 9,542,286 B2
(45) Date of Patent: Jan. 10, 2017

(54) FAILURE LOGGING MECHANISM TO REDUCE GARBAGE COLLECTION TIME IN PARTIALLY REUSED BAD BLOCKS

(71) Applicant: SanDisk Technologies Inc., Plano, TX (US)

(72) Inventors: Kaushik Kumar Bar, Bangalore (IN); Chetan Agrawal, Bangalore (IN); Dinesh Agarwal, Bangalore (IN); Vimal Kumar Jain, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 130 days.

(21) Appl. No.: 14/700,522

(22) Filed: Apr. 30, 2015

(65) Prior Publication Data

US 2016/0092325 A1 Mar. 31, 2016

(30) Foreign Application Priority Data

Sep. 30, 2014 (IN) .......................... 4916/CHE/2014

(51) Int. Cl.
  *G06F 11/07* (2006.01)
  *G06F 11/20* (2006.01)
  *G06F 3/06* (2006.01)
  *G06F 11/16* (2006.01)

(52) U.S. Cl.
  CPC ......... *G06F 11/2094* (2013.01); *G06F 3/0608* (2013.01); *G06F 3/0619* (2013.01); *G06F 3/0652* (2013.01); *G06F 3/0673* (2013.01); *G06F 11/0766* (2013.01); *G06F 11/1666* (2013.01); *G06F 11/20* (2013.01)

(58) Field of Classification Search
  CPC .............. G06F 11/0787; G06F 11/1068; G06F 2211/1032
  USPC ........................................................ 701/6.11
  See application file for complete search history.

(56) References Cited

U.S. PATENT DOCUMENTS

| | | | |
|---|---|---|---|
| 6,285,607 B1 | 9/2001 | Sinclair | |
| 2003/0166818 A1 | 9/2003 | Griswold | |
| 2005/0166087 A1* | 7/2005 | Gorobets | ............ G06F 11/1072 714/6.32 |
| 2010/0325351 A1* | 12/2010 | Bennett | ............... G06F 12/0246 711/103 |
| 2011/0219174 A1* | 9/2011 | Gorobets | ............ G06F 11/1072 711/103 |
| 2015/0100847 A1* | 4/2015 | Ojalvo | ................ G06F 11/1068 714/764 |
| 2015/0187442 A1* | 7/2015 | Sivasankaran | ....... G11C 29/765 365/185.09 |

(Continued)

OTHER PUBLICATIONS

Pending U.S. Appl. No. 14/261,750, filed Apr. 25, 2014, Sivasankaran et al.

*Primary Examiner* — Chae Ko
(74) *Attorney, Agent, or Firm* — Brinks Gilson & Lione

(57) ABSTRACT

A memory system logs failures to optimize garbage collection in partial bad blocks that are reused in non-volatile memory. A failure in a primary block may be logged in an inverse global address table. A garbage collection operation can reference the log in order to automatically avoid the failure in the primary block when the primary block is picked as the source block for garbage collection. Likewise, the garbage collection operation may scan only the logged wordlines in the secondary block when the secondary block is picked as the source block for garbage collection.

20 Claims, 7 Drawing Sheets

(56) References Cited

U.S. PATENT DOCUMENTS

2015/0287478 A1* 10/2015 Chen .................. G11C 29/26
　　　　　　　　　　　　　　　　　　　　714/719
2016/0092309 A1* 3/2016 Gao .................. G06F 11/108
　　　　　　　　　　　　　　　　　　　　714/6.23
2016/0124848 A1* 5/2016 Bellorado ........... G06F 12/0253
　　　　　　　　　　　　　　　　　　　　711/103

* cited by examiner

Figure 7

Log entry Structure

| PrimaryMetablo ckNumber | SecondaryMeta blockNumber | StartOffset | EndOffset |
|---|---|---|---|
| | | | |

If the source block for garbage collection matches primary field in log entry, skip the region between start offset and end offset. If it matches for secondary scan only this region.

FAILURE LOGGING MECHANISM TO REDUCE GARBAGE COLLECTION TIME IN PARTIALLY REUSED BAD BLOCKS

PRIORITY

This application claims priority to Indian Patent Application No. 4916/CHE/2014, entitled "FAILURE LOGGING MECHANISM TO REDUCE GARBAGE COLLECTION TIME IN PARTIALLY REUSED BAD BLOCKS," filed on Sep. 30, 2014, the entire disclosure of which is hereby incorporated by reference.

TECHNICAL FIELD

This application relates generally to memory devices. More specifically, this application relates to logging failures to optimize garbage collection in partial bad blocks that are reused in non-volatile memory.

BACKGROUND

Non-volatile memory systems, such as flash memory, have been widely adopted for use in consumer products. Flash memory may be found in different forms, for example in the form of a portable memory card that can be carried between host devices or as a solid state disk ("SSD") embedded in a host device. Flash memory may be written in pages and erased in blocks, so once a page is written, a rewrite may require the whole block to be erased. When writing data to a conventional flash memory system, a host typically writes data to, and reads data from, addresses within a logical address space of the memory system. In particular, the memory device firmware may handle memory in logical groups and the logical to physical address table (i.e. the global address table or "GAT") may have an entry for each logical group. The memory system maps data between the logical address space and the physical blocks or meta-blocks of the memory. The GAT identifies data in fixed logical groups corresponding to ranges in the logical address space. Generally, each fixed logical group is stored in a separate physical block of the memory system. The GAT tracks how the logical address space is mapped into the physical memory.

A drawback of memory systems that operate in a logical address space is fragmentation. Data written by a host file system may often be fragmented in logical address space, where many fixed logical groups are only partially updated with new data. In particular, data updates sent by a host may create partially obsolete blocks where valid data occupies part of a block and obsolete data occupies the rest of the block. The fragmentation may occur as a result of cumulative fragmentation of free space by the host file system, and possibly even as a result of inherent fragmentation of individual files by the host file system. Data previously written may become obsolete due to deletion and cause further fragmentation. Free space can generally only be reclaimed in flash memory by performing data copy operations, such as garbage collection, on the partially obsolete blocks. Garbage collection may be needed to aggregate obsolete data together in blocks to be erased. The performance of a memory system may be degraded by increased fragmentation and frequent garbage collection.

A program failure in a block may corrupt the header information, which would limit the logical group information and make garbage collection more difficult or impossible. Identification of which memory (pages/fragments/blocks/meta-blocks) is bad may be necessary for decreasing the risk of losing stored data. For example, memory blocks that are identified as bad may be avoided entirely while good blocks or blocks that are not identified as bad may be used without restrictions. However, avoiding an entire memory block may unnecessarily reduce the overall capacity of the memory. Bad blocks may be replaced with spare blocks, but that also reduces the overall memory capacity, and an insufficient number of spare blocks on a particular die may result in the memory not being able to replace a particular bad block.

SUMMARY

The backward scan logic used in garbage collection optimizes the scan process by skipping fragments backward by run-length as stored in headers. However, there may be no way to differentiate between uncorrectable error correction codes (UECC) due to data retention issues and UECC due to program failure. Therefore, the backward scan logic must scan fragment by fragment in the failed wordlines. These unnecessary scans can impact system performance.

It may be desirable to improve garbage collection in a dual programming architecture by reusing partially bad blocks rather than replacing them with an optimized version of garbage collection. Given that a logical group (LG) may span multiple wordlines or that multiple LGs can exist in a single wordline Having both a primary block and a secondary update block may increase the load on the garbage collection operation. By logging failures in the primary block, the memory system can optimize garbage collection in those partial bad blocks. For example, the failure data for the system may be logged in a control page in a GAT block, and an inverse GAT (IGAT) may record that this block had failure. A garbage collection operation can reference the log in order to automatically avoid scanning the failure region in the primary block, and scan only in the logged region in case of secondary block.

BRIEF DESCRIPTION OF THE DRAWINGS

FIG. 7 is a diagram of an exemplary failure log structure.

BRIEF DESCRIPTION OF THE PRESENTLY PREFERRED EMBODIMENTS

Figure 1:
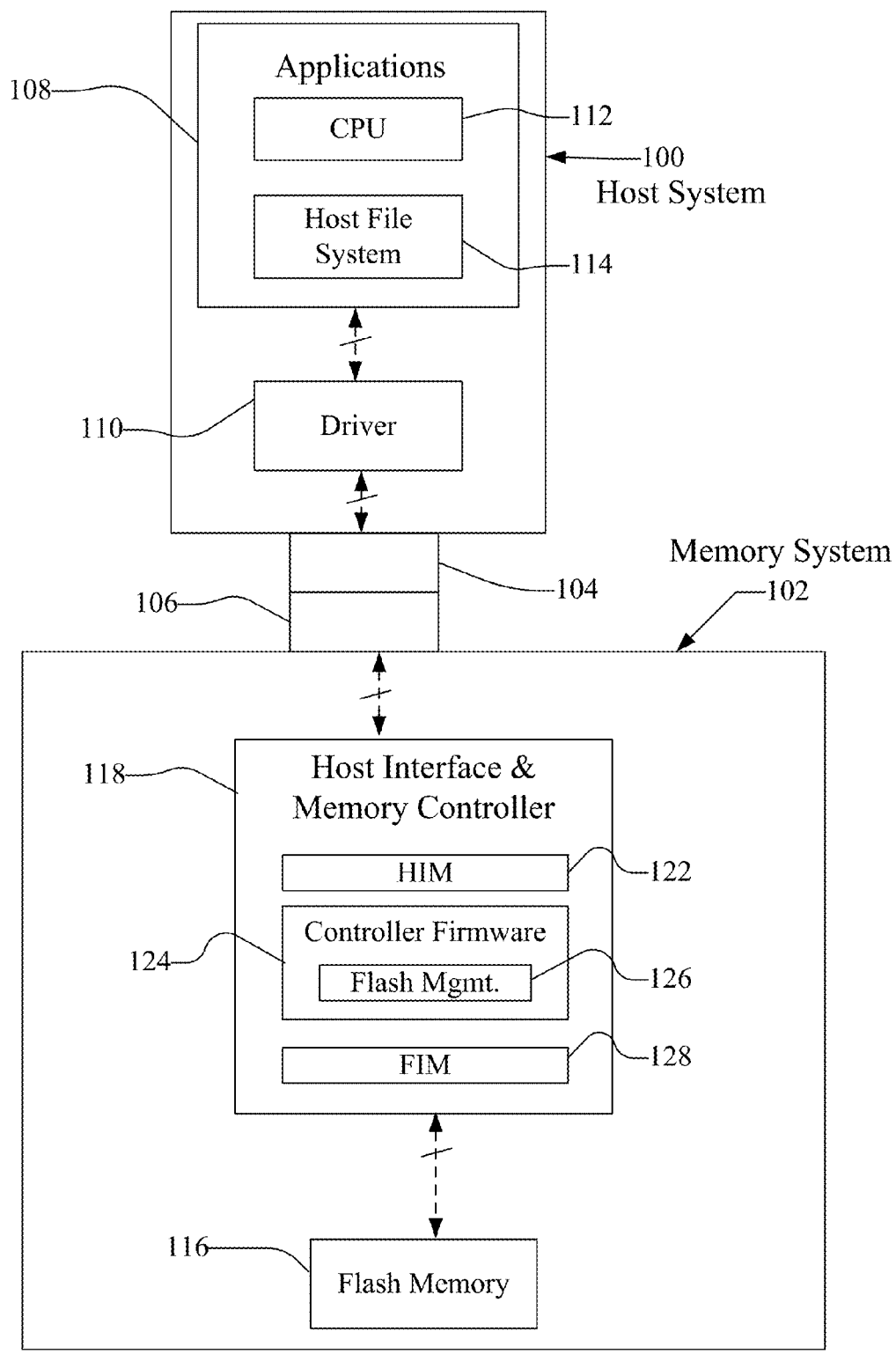
FIG. 1 is a block diagram of a host connected with a memory system having non-volatile memory.

A flash memory system suitable for use in implementing aspects of the invention is shown in FIGS. 1-4. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives. As described, flash memory may refer to the use of a negated AND (NAND) cell that stores an electronic charge.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The host system 100 of FIG. 1 may be viewed as having two major parts, insofar as the memory device 102 is concerned, made up of a combination of circuitry and software. An applications portion 108 may interface with the memory device 102 through a file system module 114 and driver 110. In a PC, for example, the applications portion 108 may include a processor 112 for running word processing, graphics, control or other popular application software. In a camera, cellular telephone that is primarily dedicated to performing a single set of functions, the applications portion 108 may be implemented in hardware for running the software that operates the camera to take and store pictures, the cellular telephone to make and receive calls, and the like.

The memory system 102 of FIG. 1 may include nonvolatile memory, such as flash memory 116, and a device controller 118 that both interfaces with the host 100 to which the memory system 102 is connected for passing data back and forth and controls the memory 116. The device controller 118 may be implemented on a single integrated circuit chip, such as an application specific integrated circuit (ASIC). The device controller 118 may include a multi-thread processor capable of communicating via a memory interface 128 having I/O ports for each memory bank in the flash memory 116. The device controller 118 may include an internal clock. The processor of the device controller 118 may communicate with an error correction code (ECC) module, a RAM buffer, and a boot code ROM via an internal data bus.

The memory system RAM may include a master index page (MIP) that is a control structure that holds the most up-to-date information about the MML module data structures and references to the modules. Upon booting/initialization, a copy of MIP is loaded to RAM. This provides quicker access to MIP and to modules MIP utilizes. In addition, MIP includes information about the free block list (FBL), the current update blocks being used, global address table (GAT) or inverted global address table (IGAT) deltas and other relevant information used by other modules in MML. The failure log described below that is utilized as part of or along with the IGAT for optimizing the garbage collection operation may be stored in the GAT block as a separate control page and MIP contains the reference to this control page.

The device controller 118 may convert between logical addresses of data used by the host 100 and physical addresses of the flash memory 116 during data programming and reading. Functionally, the device controller 118 may include a Host interface module (HIM) 122 that interfaces with the host system controller logic 110, and controller firmware module 124 for coordinating with the host interface module 122, and flash interface module (FIM) 128. Flash management logic 126 may be part of the controller firmware 124 for internal memory management operations such as garbage collection. One or more flash interface modules (FIMs) 128 may provide a communication interface between the controller and the flash memory 116. The memory device firmware may handle memory in logical groups and the logical to physical address table (i.e. the global address table or "GAT") may have an entry for each logical group. In particular, the GAT page may include mapping of the logical to the physical address translation for each logical group.

A flash transformation layer ("FTL") or media management layer ("MML") may be integrated in the flash management 126 and may handle flash errors and interfacing with the host. In particular, flash management 126 is part of controller firmware 124 and MML may be a module in flash management. The MML may be responsible for the internals of NAND management. In particular, the MML may be an algorithm in the memory device firmware which translates writes from the host 100 into writes to the flash memory 116. The MML may include the logical block address ("LBA") map that translates addresses for the flash memory. An MML algorithm may provide logical to physical address mapping which includes an algorithm to convert logical addresses from the file system to physical addresses of flash memory. The MML may include the establishment or classification of meta-blocks and the dual programming of those meta-blocks.

In one embodiment, the flash memory 116 may be considered to include multi-level cell (MLC) or single level cell (SLC) memory. The memory may be included as part of the device controller 118 rather than as part of the flash memory 116 in some embodiments. The flash memory 116 may be mostly MLC, while binary cache and update blocks may be SLC memory. Update blocks may be SLC memory with page based addressing or page based Logical Group (LG) organization. The LG size for the GAT may depend on the data. For example, sequential data may be indexed with a large LG size, while fragmented data may be indexed with a smaller LG size. In particular, the GAT may default to a large LG size, but reference additional GAT pages for fragmented data, where the additional GAT pages include a smaller LG size. The LG size for the GAT and additional GAT pages may occur at the MML or flash management 126 of the controller 118.

Figure 2:
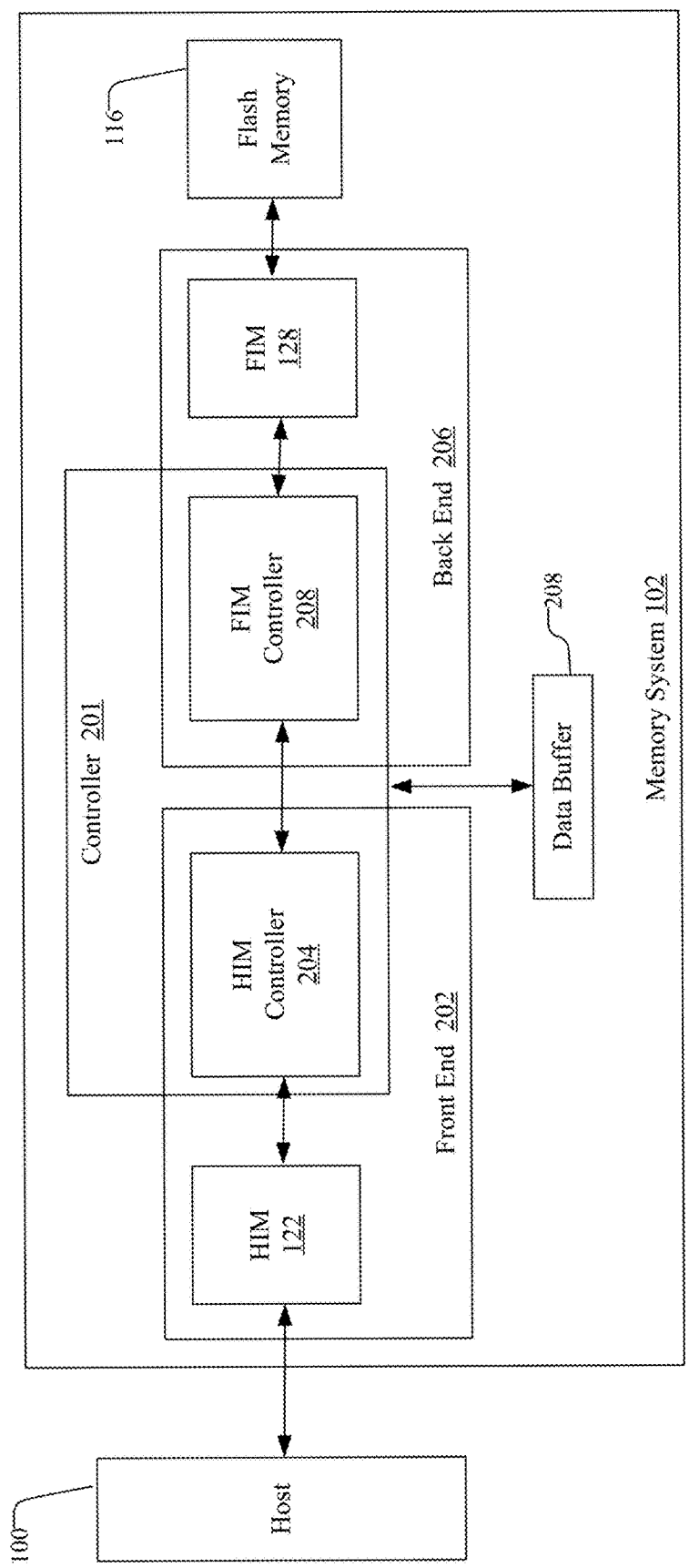
FIG. 2 is a block diagram of an alternative memory communication system.

FIG. 2 is a block diagram of an alternative memory communication system. The host system 100 is in communication with the memory system 102 as discussed with respect to FIG. 1. The memory system 102 includes a front end 202 in communication with the host and a back end 206 coupled with the flash memory 116. In one embodiment, the front end 202 and the back end 206 may be referred to as the memory controller and may be part of the device controller 118. The front end 202 may logically include a Host Interface Module (HIM) 122 and a HIM controller 204. The back end 206 may logically include a Flash Interface Module (FIM) 128 and a FIM controller 208. Accordingly, the controller 201 may be logically portioned into two modules, the HIM controller 204 and the FIM controller 208. The HIM 122 provides interface functionality for the host device 100, and the FIM 128 provides interface functionality for the flash memory 116. The controller 201 may be coupled with a data buffer 208.

In operation, data is received from the HIM 122 by the HIM controller 204 during a write operation of host device 100 on the memory system 102. The HIM controller 204 may pass control of data received to the FIM controller 208, which may include the MML discussed above. The FIM controller 208 may determine how the received data is to be written onto the flash memory 116 optimally. The received data may be provided to the FIM 128 by the FIM controller 208 for writing data onto the flash memory 116 based on the determination made by the FIM controller 208. The FIM controller 208 and the MML may operate the failure logging and dual programming of meta-blocks as described below with respect to FIGS. 5-8.

Figure 3:
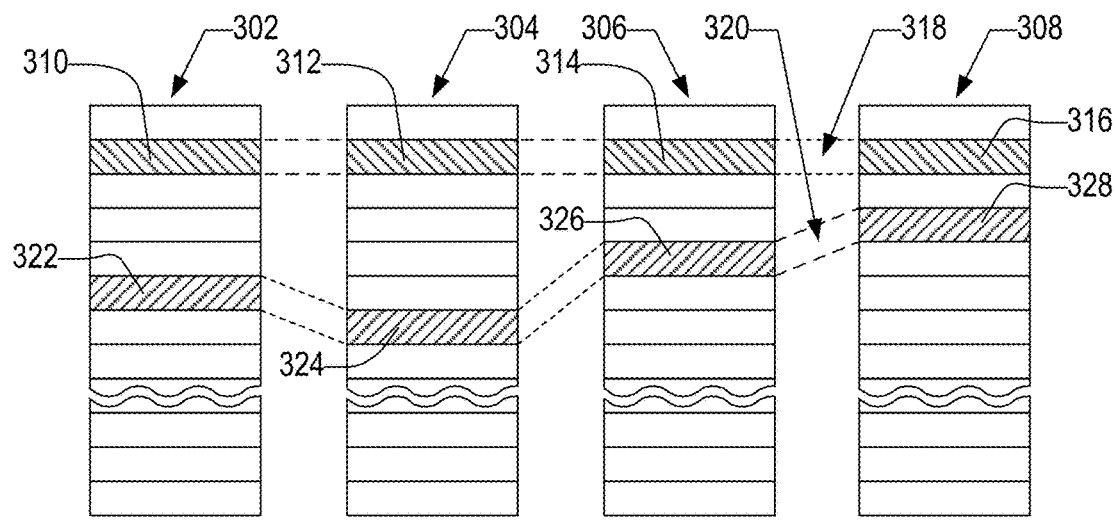
FIG. 3 is an example physical memory organization of the system of FIG. 1.

FIG. 3 conceptually illustrates an organization of the flash memory 116 (FIG. 1) as a cell array. The flash memory 116 may include multiple memory cell arrays which are each separately controlled by a single or multiple memory controllers 118. Four planes or sub-arrays 302, 304, 306, and 308 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as blocks. Blocks of memory cells are shown in FIG. 3 by rectangles, such as blocks 310, 312, 314, and 316, located in respective planes 302, 304, 306, and 308. There can be any number of blocks in each plane.

The block of memory cells is the unit of erase, and the smallest number of memory cells that are physically erasable together. For increased parallelism, however, the blocks may be operated in larger metablock units or chunks. One block from each plane is logically linked together to form a metablock. The four blocks 310, 312, 314, and 316 are shown to form one metablock 318. All of the cells within a metablock are typically erased together. The blocks used to form a metablock need not be restricted to the same relative locations within their respective planes, as is shown in a second metablock 320 made up of blocks 322, 324, 326, and 328. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 4:
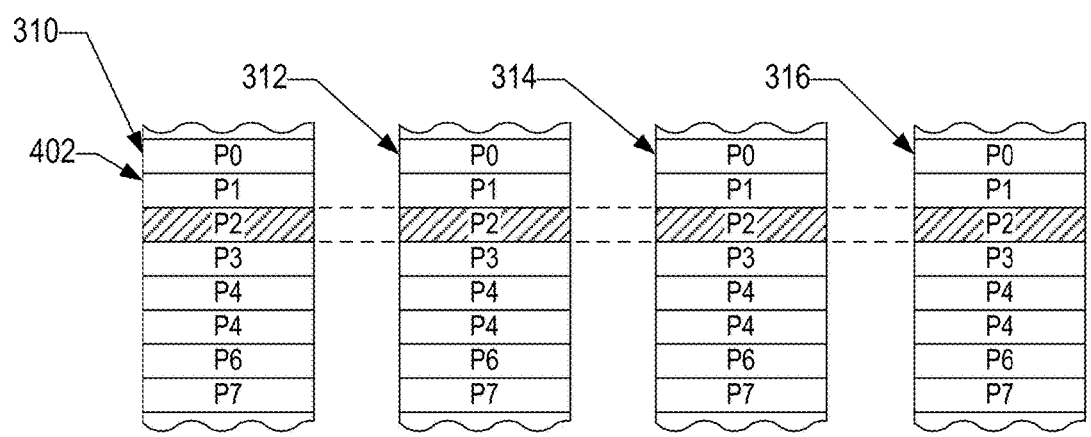
FIG. 4 is an expanded view of a portion of the physical memory of FIG. 3.

The individual blocks are in turn divided for operational purposes into pages of memory cells, as illustrated in FIG. 4. The memory cells of each of the blocks 310, 312, 314, and 316, for example, are each divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 402 is illustrated in FIG. 3, being formed of one physical page from each of the four blocks 310, 312, 314, and 316. The metapage 402, for example, includes the page P2 in each of the four blocks but the pages of a metapage need not necessarily have the same relative position within each of the blocks. A metapage may be the maximum unit of programming.

The memory cells may be operated to store two levels of charge so that a single bit of data is stored in each cell. This is typically referred to as a binary or single level cell (SLC) memory. SLC memory may store two states: 0 or 1. Alternatively, the memory cells may be operated to store more than two detectable levels of charge in each charge storage element or region, thereby to store more than one bit of data in each. This latter configuration is referred to as multi-level cell (MLC) memory. For example, MLC memory may store four states and can retain two bits of data: 00 or 01 and 10 or 11. Both types of memory cells may be used in a memory, for example binary SLC flash memory may be used for caching data and MLC memory may be used for longer term storage. The charge storage elements of the memory cells are most commonly conductive floating gates but may alternatively be non-conductive dielectric charge trapping material.

Bad blocks (blocks with unusable physical area for at least one or more wordlines) may be at least partially used. This increases the logical capacity of the memory by allowing the system to absorb more failed blocks. The partial bad blocks may include good storage space (good wordlines) and bad storage space (bad wordlines). The good storage space may still be used and the entire block is not disregarded as was done previously. The individual wordlines may be marked as bad rather than marking an entire block as bad because of one or more bad wordlines.

Figure 5:
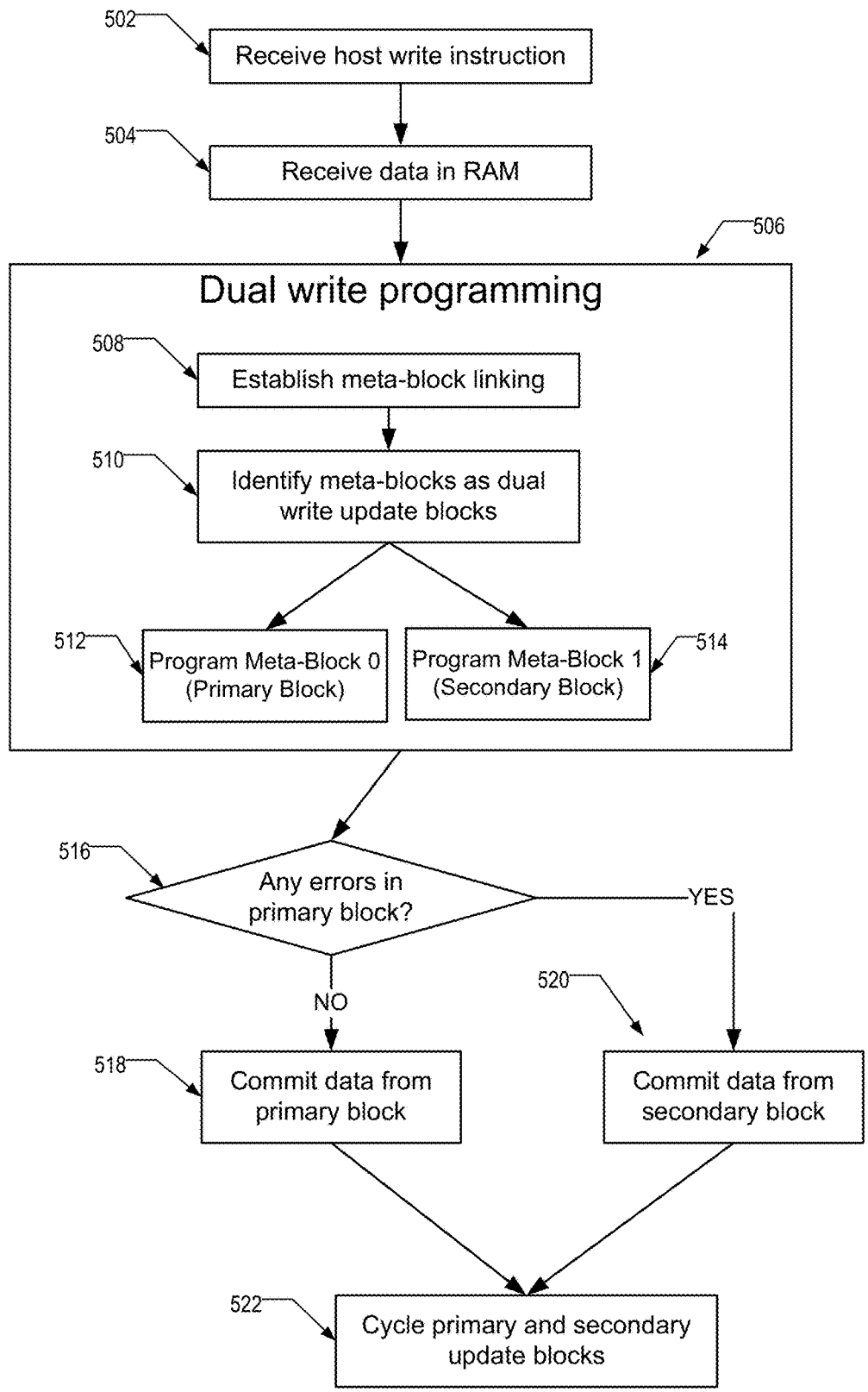
FIG. 5 is flow chart illustrating an exemplary dual programming process.
Figure 6:
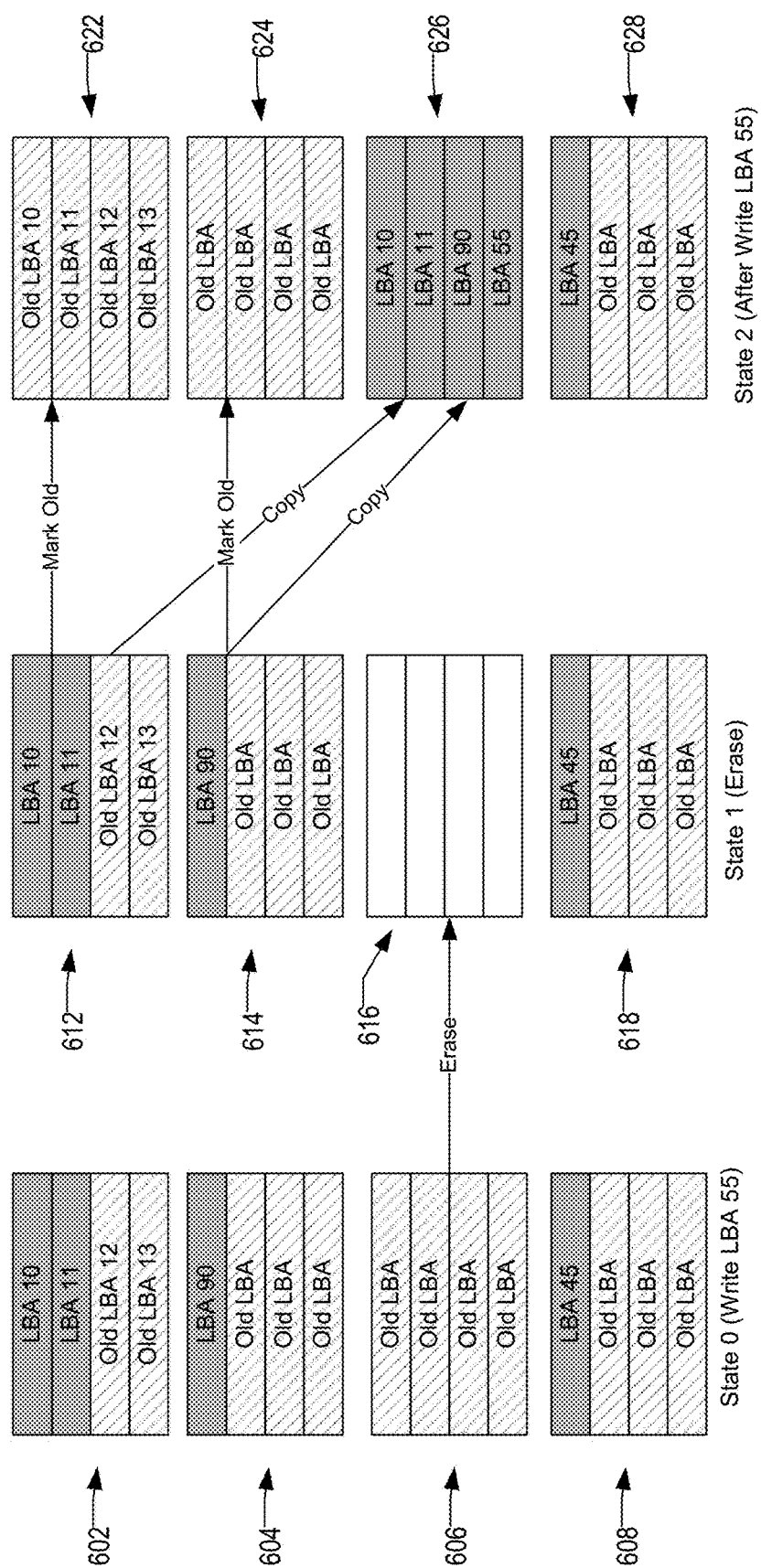
FIG. 6 illustrates an example of garbage collection.

This bad/good wordline information may be logged for improving a garbage collection operation (see e.g. FIG. 6 for garbage collection). The logging (i.e. failure logging) may be done in a control page in GAT block and corresponding flags for the meta-blocks in an Inverse Global Address Table (IGAT) are used to log the wordline information corresponding to a primary update meta-block and a secondary update meta-block. The primary/secondary update blocks are described below with respect to the dual programming description (see e.g. FIG. 5). When garbage collection is performed, then this information from the IGAT can be used to reduce the garbage collection scanning by replacing a scan of the failed regions of the primary with corresponding regions from the secondary.

Dual Programming

The failure logging mechanism described herein may be within a dual write or dual programming scheme. An exemplary dual programming scheme is described with respect to FIG. 5. Dual programming is further described in U.S. patent application Ser. No. 14/291,560, filed on May 30, 2014, entitled "PROTECTION SCHEME WITH DUAL PROGRAMMING OF A MEMORY SYSTEM", the entire disclosure of which is herein incorporated by reference.

FIG. 5 is flow chart illustrating an exemplary dual programming process. FIG. 5 illustrates an exemplary process by which data protection may be achieved through the dual writing to multiple meta-blocks. In block 502, a host write instruction is received at the memory system (e.g. at the host interface). Based on the instruction from the host (to program certain data on the memory), the data is received in RAM in block 504. From the RAM, the memory system may utilize the dual programming in block 506. Dual programming may include simultaneous or near simultaneous programming of the same data in different blocks. In the embodiment described below, the data is written to two blocks, but in other embodiments, there may be additional blocks for programming the data for added protection. The dual programming 506 may include an initial establishment of meta-block linking in block 508. The meta-block linking may not occur as part of every host write instruction, but rather may be set upon initialization and further updated (e.g. as in the cycling of blocks as discussed below in block 522). In other words, the establishing of meta-block linking may be optional for each host write if meta-block linking previously occurred. The meta-blocks that are to be used for dual programming update blocks may be identified in block 510. The host data is written to two update blocks, primary and secondary, simultaneously or substantially simultaneously. The identification may include the identification of meta-block 0 (i.e. "primary block") and a meta-block 1 ("secondary block"). The host data that is received from the host may be programmed to both the primary block and the secondary block. Having the data programmed twice can be a fail-safe for retrieving data when there has been a failure. For example, if there is a failure in the primary block, then the data is not lost because the secondary block may be used to retrieve the data as further discussed below with respect to blocks 516-520 in FIG. 5.

When the dual programming 506 has occurred and the update meta-blocks are programmed, there may be an error checking function that is performed in order to understand whether data committed from the primary block has been corrupted, and when corruption is detected, LBAs from the failed regions are committed from the secondary block. In block 516, errors in the primary block are checked, such as with enhanced post-write-read error management (EPWR). If there are no uncorrectable error codes (UECC) from EPWR in the primary block, then the data is committed from the primary block as in block 518. If there is a UECC in the primary block, then the data may be committed from the secondary block in block 520. After programming a certain number of wordlines (WLs) in the primary block, EPWR may be performed before committing the data in those WLs. If there is a UECC during EPWR or program failure or WL-WL short while programming the primary block, the data in the affected logical pages may be indexed from the secondary block, rather than the primary block. In one embodiment, there may be an optimistic commit from the primary update blocks in which data is committed from the primary block without checking for failure using EPWR. When the primary block is full, EPWR may be checked and when there is a failure, data in the failed region is committed from the secondary block rather than the primary block.

Garbage Collection

Garbage Collection (GC) may be one example of a maintenance operation. GC is a generic term that may include cleaning up and freeing up obsolete capacity in memory. Garbage collection may be performed on a block-per-block basis, across blocks, or on only part of a block. Garbage collection may consist of copying remaining valid data from a previously written block to a new block so that the previously written block may be recycled for later use. One type of garbage collection includes garbage collection necessitated by a host command where valid data from a block that has had some data made obsolete is copied to another block and consolidated with updated data corresponding to the data made obsolete by the host command in order to keep certain groups of logical addresses together. Garbage collection may be according to the embodiments shown and described in U.S. Pat. Pub. No. 2013/0166818, published Jun. 27, 2013, entitled "MEMORY LOGICAL DEFRAGMENTATION DURING GARBAGE COLLECTION", the entire disclosure of which is herein incorporated by reference.

FIG. 6 illustrate garbage collection performed by the memory system illustrated in FIGS. 1-4. In particular, the flash memory 116 may be subject to garbage collection performed by the controller 118. FIG. 4 illustrates blocks with eight pages, while FIG. 6 illustrate blocks with four pages. Alternatively, there may be 16, 32 or more pages of memory cells within each block. Although FIGS. 3 and 4 illustrate meta-pages and meta-blocks, the garbage collection description (e.g. FIG. 6) may refer to garbage collection for individual blocks (e.g. by copying individual pages) rather than meta-blocks or meta-pages. The concepts described are applicable to any blocks, meta-blocks, pages, or meta-pages. A region within a block that is bad (with a failure or error) may be referred to as a fragment. For example, a bad wordline in a block may result in fragments of the block being bad. A fragment may be a portion of a page/meta-page or may be a number of pages/meta-pages.

FIG. 6 illustrates an example of garbage collection. As discussed above, FIG. 2 illustrates blocks 210, 212, 214, 216 that include pages P0-P7. Likewise, FIG. 6 illustrates a set of four blocks that are shown in three different states (States 0, 1, and 2). In the embodiment shown, each block includes four pages, but the number of pages may be more or less. The pages are addressed using logical block addressing (LBA) that specifies the location of each block of data using a simple linear addressing scheme. For example, the blocks may be located by an integer index. With LBA, each address may refer to a single block. In alternative examples, different addressing schemes may be utilized for the organization of memory, and in particular, the organization of pages within blocks.

Each of the four blocks in FIG. 6 are labeled separately in each of the three states for ease of reference, but they may represent the same four blocks with memory contents during the three different states. At State 0, blocks 602, 604, 606, 608 include a mix of obsolete data (Old LBA) and valid/good data that is labeled by its LBA number. Obsolete data may also be referred to as old, invalid, or state data. Block 602 includes two blocks of valid data, LBA 10 and LBA 11, along with two blocks of obsolete data (Old LBA). Block 604 includes one block of valid data, LBA 90 and three blocks of obsolete data. Block 606 includes four blocks of obsolete data. Block 608 includes one block of valid data, LBA 45, and three blocks of obsolete data.

State 0 reflects the state of blocks 602, 604, 606, 608 before receiving an instruction to write new data, LBA 55. In order to write LBA 55, there must be an empty block to write to. Accordingly, State 1 illustrates the erasing of block 606 to produce empty block 616. In particular, block 602 remains unchanged and is shown as block 612, block 604 remains unchanged and is shown as block 614, and block 608 remains unchanged and is shown as block 618. Block 616 is the erased version of block 606. Block 606 included only obsolete data, so it was erased in State 1 as block 616. Block 616 is empty in State 1 and available to have data written to it since it is erased and empty.

State 2 reflects the four blocks after LBA 55 is written. In particular, State 2 illustrates garbage collection (GC) that occurs for existing blocks. In particular, blocks 612, 614, and 618 each include a mixture of both valid data and obsolete data and garbage collection may include an operation for consolidating valid data and/or consolidating obsolete data. In one embodiment, the consolidation or aggregation of valid data may result in the aggregation of obsolete data because the valid data in blocks with both valid and obsolete data is moved out, so that only obsolete data remains in the block. Blocks with only obsolete data can be erased/emptied so that they can now be written to. Valid data (LBA 10 and LBA 11) from block 612 and valid data (LBA 90) from block 614 are copied to empty block 616 which becomes block 626. Garbage collection in this case includes taking the valid data from blocks 612 and 614 and writing them to block 626. As a result, block 612 has its only valid data removed (LBA 10 and LBA 11) and is marked as obsolete in block 622. Block 622 only includes obsolete data and may be erased so new data can be written to it. Likewise, block 614 has its only valid data removed (LBA 90) and is marked as obsolete in block 624. Block 624 only includes obsolete data and may be erased so new data can be written to it. Block 618 is unchanged and includes only LBA 45 in block 628.

The garbage collection in state 2 results in two blocks 622, 624 that are empty rather than having four blocks that include a mixture of good/valid data and obsolete data. Garbage collection may attempt to free up the maximum number of blocks, so that those free blocks are then available to be written to. For example, if there were a state 3 to FIG. 6, blocks 622 and 624 could be erased and either of those blocks could be written to with new data. In other words, garbage collection can group together valid data and group obsolete data. When a block includes only obsolete data, it can be erased so that new data can be written to that block. Garbage collection is used to maximize storage in blocks by minimizing the number of partially used blocks. As described below, garbage collection can be optimized by failure logging (logging a failure on primary update meta-block) and adjusting the garbage collection operation based on the presence of such a failure. This can limit the amount of scanning that is required of the garbage collection operation.

A failure log may record error information associated with the primary update meta-block. That logging information can then be used during a garbage collection so that the garbage collection operation can skip over fragments from the primary block that are associated with the error. Fragments refers to a region affected by the failure and may be of any size, such as one or more pages. In one example, the error may be to a particular wordline in a primary update block, and the same block may then be picked up as the source block for garbage collection, in which case the garbage collection operation does not scan fragments associated with that wordline. For the same failures in the same primary update block, if the secondary block is picked up as the source block for garbage collection, the garbage collection operation scans only those pages (i.e. pages with the same data) from the secondary update block.

The optimization described herein makes intelligent use of a log or system history to improve garbage collection. In particular, the wordline information corresponding to primary and secondary blocks is logged when an EPWR failure or program failure occurs on primary/secondary block. The logging may include recording the block number for which such action needs to be taken in IGAT. The garbage collection operation can then conditionally (based on a status of this block maintained by IGAT) make use of the log while scanning the wordlines in a partial bad block. When the bad block is a primary block which was picked for garbage collection, the marked wordlines or fragments associated with those wordlines are skipped. Likewise only the marked wordlines/fragments are scanned in a secondary block if the secondary block is picked for garbage collection. In other words, the bad data associated with the marked wordlines/fragments in the primary block is skipped (not scanned during the garbage collection operation), while that corresponding data stored in the secondary block is the only data for that block that is scanned as part of the garbage collection operation. In order to reduce space (e.g. in a garbage collection context block) required for logging the data, the logging logic may code the failed wordline data, while the garbage collection logic decodes the same before making use of it.

FIG. 7 is a diagram of an exemplary failure log structure. The log may be referred to as a failure log. In one embodiment, the failure log may include a primary meta-block number (PrimaryMetablockNumber), a secondary meta-block number (SecondaryMetablockNumber), a start for the offset (StartOffset) and an end for the offset (EndOffset). The primary meta-block number and the secondary meta-block number identify the primary and secondary meta-blocks. As described above regarding dual programming, a primary and secondary update metablock have the same data. This redundant data is a fail-safe in case of errors. The failure log identifies both of these update blocks.

If the primary metablock has errors (see e.g. FIG. 8), then this entry in FIG. 7 will be created. When a garbage collection operation runs, it utilizes this failure log, such that when the garbage collection operation is to scan a block that matches the primary meta-block, then the start offset and end offset identifies the region which should be skipped. In other words, the garbage collection operation utilizes the primary meta-block number to identify the primary meta-block and then utilizes the start offset and the end offset to identify the entire region (e.g. bad meta-blocks in the primary) that should not be scanned as part of the garbage collection operation. The garbage collection operation scans the corresponding region (identified by the start offset and the end offset) within the secondary meta-block rather than that region from the primary meta-block.

FIG. 7 is merely one embodiment or example of a failure log or of the information that can be logged for this garbage collection operation. In one embodiment, this log may be associated with the IGAT. For example, the IGAT may be marked for any fragment/block/meta-block/wordline that has a failure/error. Accordingly, the garbage collection operation may scan utilizing the IGAT and anytime such a failure/error marking appears in the IGAT for a block being scanned, the log is then referenced. In one embodiment, the failure log may be part of the MIP. In other embodiments, the IGAT may be modified to act as the log. In an alternative embodiment, another type of control page in the GAT block may be introduced to include the log.

Figure 8:
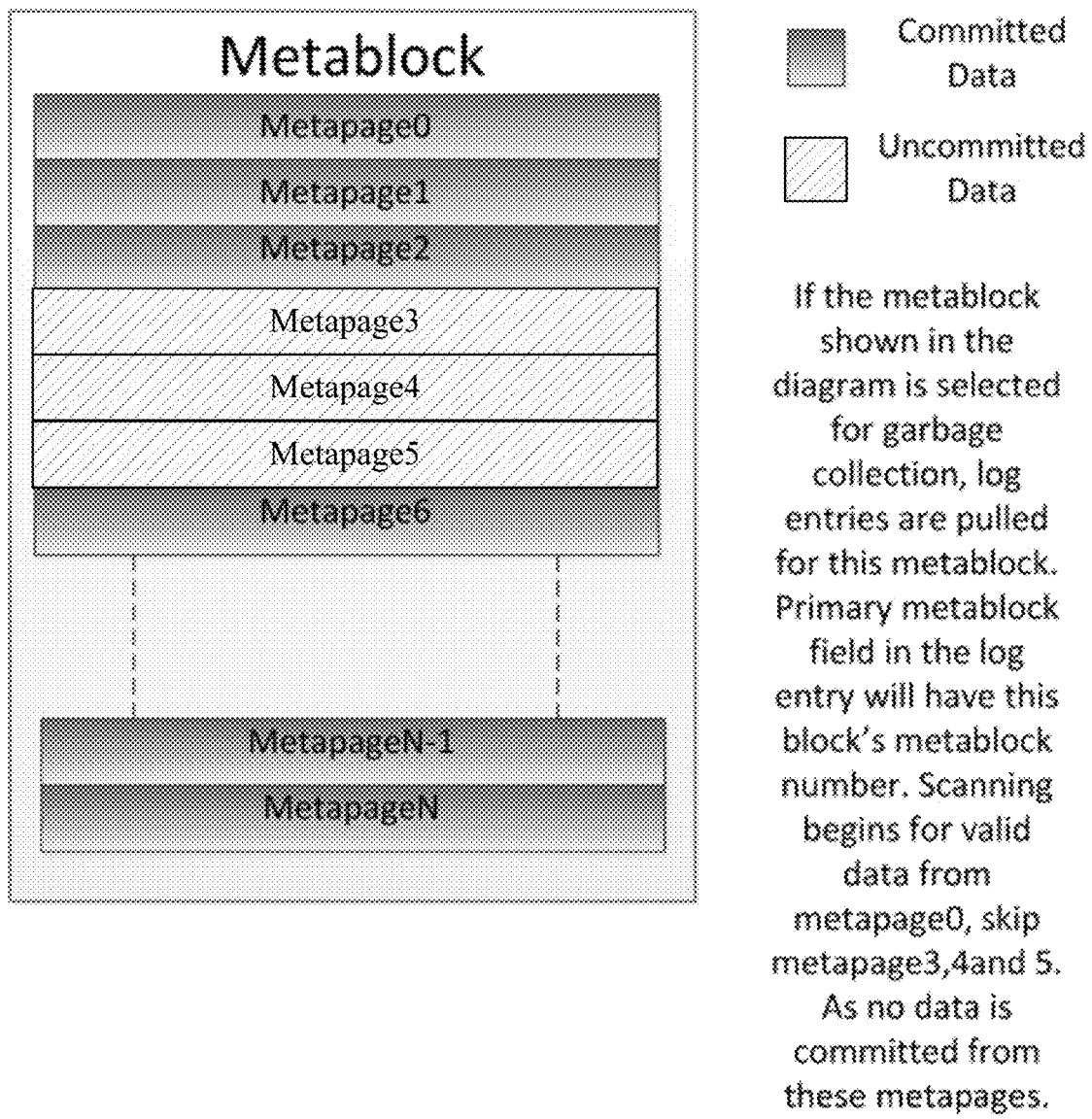
FIG. 8 is a diagram of a meta-block with pages that have failed.

FIG. 8 is a diagram of a meta-block with pages that have failed. FIG. 8 illustrates a meta-block with meta-pages that have either committed data (meta-pages 0-2 and 6-N) or have uncommitted data (meta-pages 3-5). Committed data is committed in the GAT, such that the GAT knows the logical block address (LBA) and what data is present. Uncommitted data is not referenced by the GAT. Data may be uncommitted due to an error or program failure.

If a garbage collection operation were to scan this primary meta-block shown in FIG. 8, then the IGAT would note that this block includes a program failure or error (because of meta-pages 3-5). In one embodiment, the IGAT may merely include an extra entry (e.g. flag) that identifies whether a particular block has an error or failure. The garbage collection operation would then pull the corresponding log entries for this primary meta-block. The failure log would have this primary meta-block identified as the primary metablock number (see e.g. FIG. 7). The garbage collection scan would scan meta-pages 0-2 and 6-N, but would skip scanning meta-pages 3-5 as indicated by the failure log. When the primary metablock is the source block for garbage collection, metapages 3-5 will be skipped from getting scanned. When the secondary meta-block is picked as the source block for garbage collection, only metapages 3-5 would be scanned by the garbage collection operation. In this example, the startOffset (from FIG. 7) may be (3*number of fragments per metapage), while the endOffset=(6*number of fragments per metapage)−1. The number of fragments per meta-page depends on interleaving. The number of fragments per physical page may be fixed (e.g. 4), but the number of physical pages per meta-page may depend on interleaving. Therefore, a number of fragments per meta-page also depends on interleaving.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A method for optimizing garbage collection in a memory device, the method comprising:
   identifying a program failure on a primary update block;
   recording the identified program failure and the primary update block with the identified program failure in a failure log; and
   operating the garbage collection by utilizing the failure log to avoid scanning portions of the primary update block with the program failure.

2. The method of claim 1 further comprising:
   ignoring, during the garbage collection operation, the portion of the primary update block with the program failure by using the failure log to identify the portion; and
   scanning only a portion of the secondary update block that corresponds to the portion of the primary update block with the program failure.

3. The method of claim 2 wherein the memory device utilizes a dual programming architecture where the primary update block and the secondary update block include identical data for redundancy.

4. The method of claim 3 wherein the failure log identifies the portion of the secondary update block that corresponds to the portion of the primary update block with the program failure, further wherein the portion comprises a region of fragments that are affected by the failure.

5. The method of claim 1 wherein the program failure comprises an enhanced post-write-read error management (EPWR) failure.

6. The method of claim 1 wherein the failure log comprises an update to a global address table with an identification of the primary update block with the program failure.

7. The method of claim 1 wherein the failure log is referenced from an update to an inverse global address table with an identification of the primary update block as including the program failure, further wherein the garbage collection operation references the update when scanning the primary update block.

8. The method of claim 1 wherein the program failure comprises a failure of a wordline in the primary update block.

9. The method of claim 8 wherein the garbage collection avoids scanning fragments associated with the wordline of the primary update block with the program failure.

10. A method in a memory device with dual programming, the method comprising:
identifying an error in a wordline of a primary update block;
logging the identified error from the primary update block; and
avoiding, during a garbage collection operation that utilizes the logging, a scan for fragments associated with the identified wordline.

11. The method of claim 10 further comprising:
logging a secondary update block and fragments corresponding to the fragments associated with the identified wordline; and
avoiding, during the garbage collection operation that utilizes the logging, a scan for any pages of the secondary update block except for the fragments corresponding to the fragments associated with the identified wordline.

12. The method of claim 11 wherein the avoiding comprises:
ignoring, during the garbage collection operation, the fragments on the identified wordline of the primary update block; and
logging the corresponding fragments of the secondary update block, wherein the corresponding fragments include the same data as the pages on the identified wordline of the primary update block.

13. The method of claim 10 wherein the logging comprises updating an inverse global address table to include the identified error.

14. The method of claim 10 wherein the error comprises an enhanced post-write-read error management (EPWR) failure of the identified wordline.

15. A method comprising:
identifying an error in a portion of a primary update block;
updating an inverse global address table to include the identified error; and
ignoring, during a garbage collection operation, a scan for the portion of the primary update block, wherein the garbage collection operation utilizes the inverse global address table to identify the error, further wherein a failure log that identifies the portion of the primary update block with the error.

16. The method of claim 15 wherein the method is performed on a memory device with a dual programming architecture such that data on the primary update block is the same as data on the secondary update block.

17. The method of claim 15 wherein the failure log is referenced from the inverse global address table.

18. The method of claim 15 wherein the identified error comprises a failure of a wordline in the primary update block, further wherein the portion of a primary update block comprises fragments in the primary update block associated with the failed wordline.

19. The method of claim 18 wherein the garbage collection operation avoids scanning the pages associated with the failed wordline.

20. The method of claim 19 wherein the garbage collection operation scans only fragments from the secondary update block that include the same data as the fragments in the primary update block associated with the failed wordline.

* * * * *